(12) United States Patent
Nishimoto

(10) Patent No.: US 8,498,109 B2
(45) Date of Patent: Jul. 30, 2013

(54) FITTING MECHANISM AND OUTPUT DEVICE

(75) Inventor: Naohiro Nishimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 380 days.

(21) Appl. No.: 12/498,027

(22) Filed: Jul. 6, 2009

(65) Prior Publication Data
US 2010/0014226 A1    Jan. 21, 2010

(30) Foreign Application Priority Data
Jul. 17, 2008   (JP) .................................. 2008-186100

(51) Int. Cl.
*H05K 5/00* (2006.01)

(52) U.S. Cl.
USPC ............ 361/679.41; 361/679.01; 361/679.39; 361/679.4; 369/30.01

(58) Field of Classification Search
USPC ............... 361/679.01, 679.39, 679.4, 679.41; 369/30.01
See application file for complete search history.

(56) References Cited

U.S. PATENT DOCUMENTS

| | | | | |
|---|---|---|---|---|
| 5,687,060 A | * | 11/1997 | Ruch et al. ............... | 361/679.43 |
| 5,781,232 A | * | 7/1998 | Ejima ....................... | 348/231.7 |
| 6,967,681 B2 | * | 11/2005 | Hanzawa .................. | 348/231.7 |
| 2004/0162029 A1 | * | 8/2004 | Grady ....................... | 455/42 |
| 2005/0248917 A1 | * | 11/2005 | Hiroyoshi ................. | 361/685 |
| 2005/0265569 A1 | * | 12/2005 | Langberg et al. .......... | 381/334 |
| 2006/0250764 A1 | * | 11/2006 | Howarth et al. ........... | 361/683 |
| 2006/0280045 A1 | * | 12/2006 | Ritsher et al. ............. | 369/30.01 |
| 2009/0168312 A1 | * | 7/2009 | Motoe et al. .............. | 361/679.01 |

FOREIGN PATENT DOCUMENTS

| | | |
|---|---|---|
| JP | 51-081005 U | 6/1976 |
| JP | 3299236 | 4/2002 |
| JP | 2004-135119 | 4/2004 |
| JP | 2004-326998 A | 11/2004 |
| JP | 3660523 | 3/2005 |

* cited by examiner

*Primary Examiner* — Jinhee Lee
*Assistant Examiner* — James Wu
(74) *Attorney, Agent, or Firm* — Wolf, Greenfield & Sacks, P.C.

(57) ABSTRACT

A fitting mechanism includes a door member that is provided on a front side of a housing area for accommodating a terminal device and opens and closes the housing area, and a supporting member that is provided on a back side of the housing area and supports the terminal device accommodated in the housing area by urging the terminal device against the door member. The supporting member is urged toward the front side and has an abutting portion that abuts against the terminal device, the abutting portion being movable in a depth direction of the housing area within a predetermined movable range.

7 Claims, 9 Drawing Sheets

FIG. 1
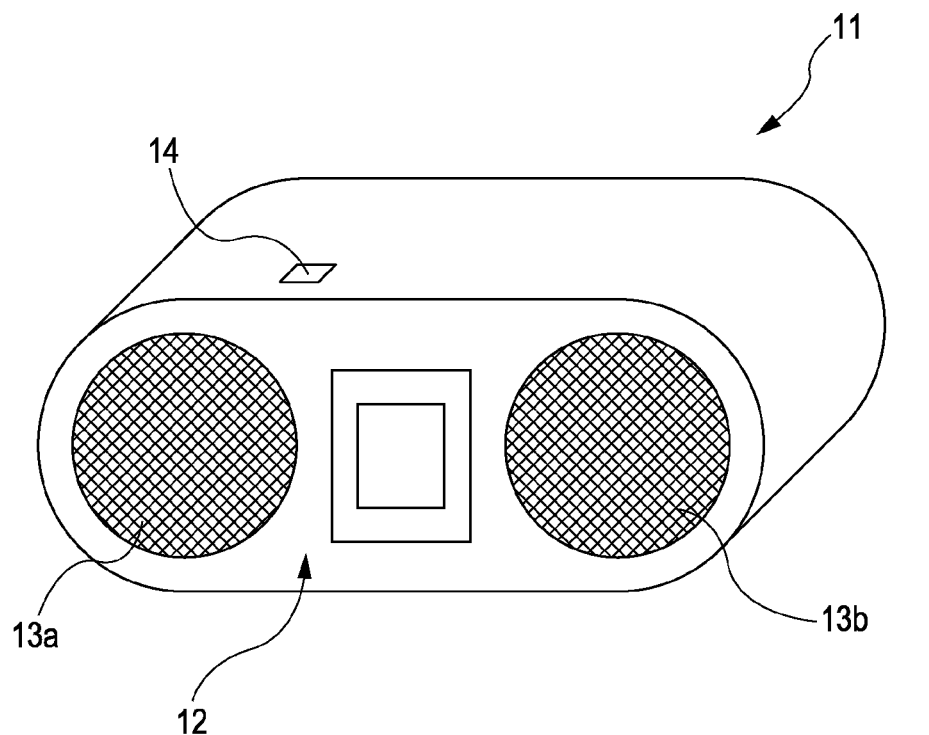
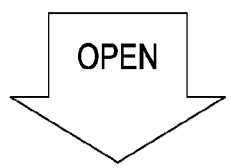
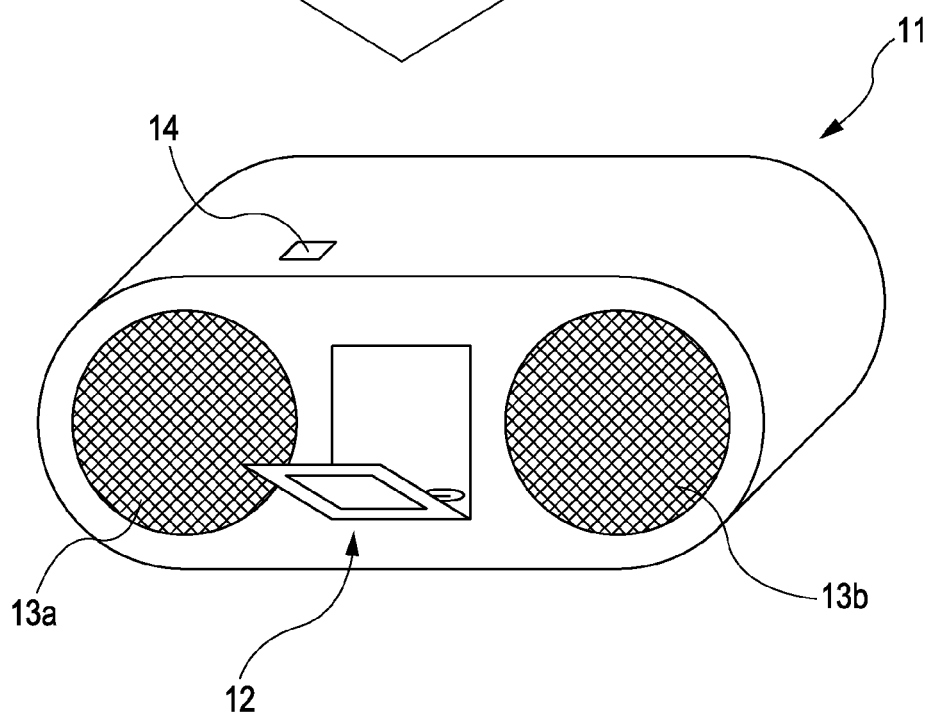

| | THICKNESS [mm] | DISTANCE FROM CONNECTOR CENTER [mm] | |
|---|---|---|---|
| | | TO FRONT SURFACE | TO BACK SURFACE |
| PORTABLE PLAYER WITH GREATEST THICKNESS | 19.1 | 9.52 | 9.58 |
| PORTABLE PLAYER WITH SMALLEST THICKNESS | 6.5 | 3.25 | 3.25 |
| DIFFERENCE | 12.6 | 6.27 | 6.33 |

FITTING MECHANISM AND OUTPUT DEVICE

BACKGROUND OF THE INVENTION

1. Field of the Invention

The present invention relates to fitting mechanisms and output devices. In particular, it relates to a fitting mechanism into which a portable player can be stably fitted and an output device.

2. Description of the Related Art

Some output devices have a connector on a case to which a portable player for playing back sound and pictures is connected and output sound from the portable player at a predetermined sound volume.

In general, the size of portable players differs by models even though their connectors have the same shape. Therefore, some output devices have the connector on the top surface of the case in order to allow portable players having different sizes to be connected thereto, and the portable players are placed on the top surface of the case.

However, such portable players placed on the top surface of the case of the output devices are unstable, leading to a user's concern about carrying such output devices with the portable players placed thereon.

If a portable player is fitted into an output device in the same manner that a cassette tape is fitted into a cassette deck, fitting of the portable player may be stabilized, making a user feel comfortable to carry the output device. However, while the size of cassette tapes is uniform, the size of portable players is different by models. Therefore, there is a demand for a fitting mechanism into which portable players having different sizes can be stably fitted and an output device having such a fitting mechanism.

Japanese Unexamined Patent Application Publication No. 2004-135119 discloses a cradle connectable to a portable information terminal. The cradle is compatible with several models of portable information terminals.

Japanese Patent No. 3660523 discloses a computer system including a portable computer and a docking station, which makes it easy to align the portable computer and the docking station.

Japanese Patent No. 3299236 discloses a docking station that can identify the model of a laptop personal computer and set an interface connector to an appropriate height.

SUMMARY OF THE INVENTION

As has been described, there is a demand for a fitting mechanism into which portable players having different sizes can be stably fitted and an output device having such a fitting mechanism.

The invention has been made in view of the above-described circumstances and it enables portable players to be stably fitted.

According to a first embodiment of the present invention, there is provided a fitting mechanism including a door member that is provided on a front side of a housing area for accommodating a terminal device and opens and closes the housing area, and a supporting member that is provided on a back side of the housing area and supports the terminal device accommodated in the housing area by urging the terminal device against the door member. The supporting member is urged toward the front side and has an abutting portion that abuts against the terminal device, the abutting portion being movable in a depth direction of the housing area within a predetermined movable range.

According to a second embodiment of the present invention, there is provided an output device including a door member that is provided on a front side of a housing area for accommodating a terminal device and opens and closes the housing area, a supporting member that is provided on a back side of the housing area and supports the terminal device accommodated in the housing area by urging the terminal device against the door member, and an output unit that outputs content played back by the terminal device. The supporting member is urged toward the front side and has an abutting portion that abuts against the terminal device, the abutting portion being movable in a depth direction of the housing area within a predetermined movable range.

According to the first and second embodiments of the invention, the door member is provided on the front side of the housing area for accommodating the terminal device and opens and closes the housing area, and the supporting member is provided on the back side of the housing area and supports the terminal device accommodated in the housing area by urging the terminal device against the door member. The abutting portion of the supporting member that comes into contact with the terminal device is movable in the depth direction of the housing area within a predetermined movable range and is urged toward the front side. Furthermore, the output device according to the second embodiment of the invention outputs content played back by the terminal device.

According to the first embodiment of the invention, portable players can be stably fitted.

BRIEF DESCRIPTION OF THE DRAWINGS

FIG. 1 is a perspective view showing a configuration example of an output device according to an embodiment of the invention;

DESCRIPTION OF THE PREFERRED EMBODIMENTS

Figure 2:
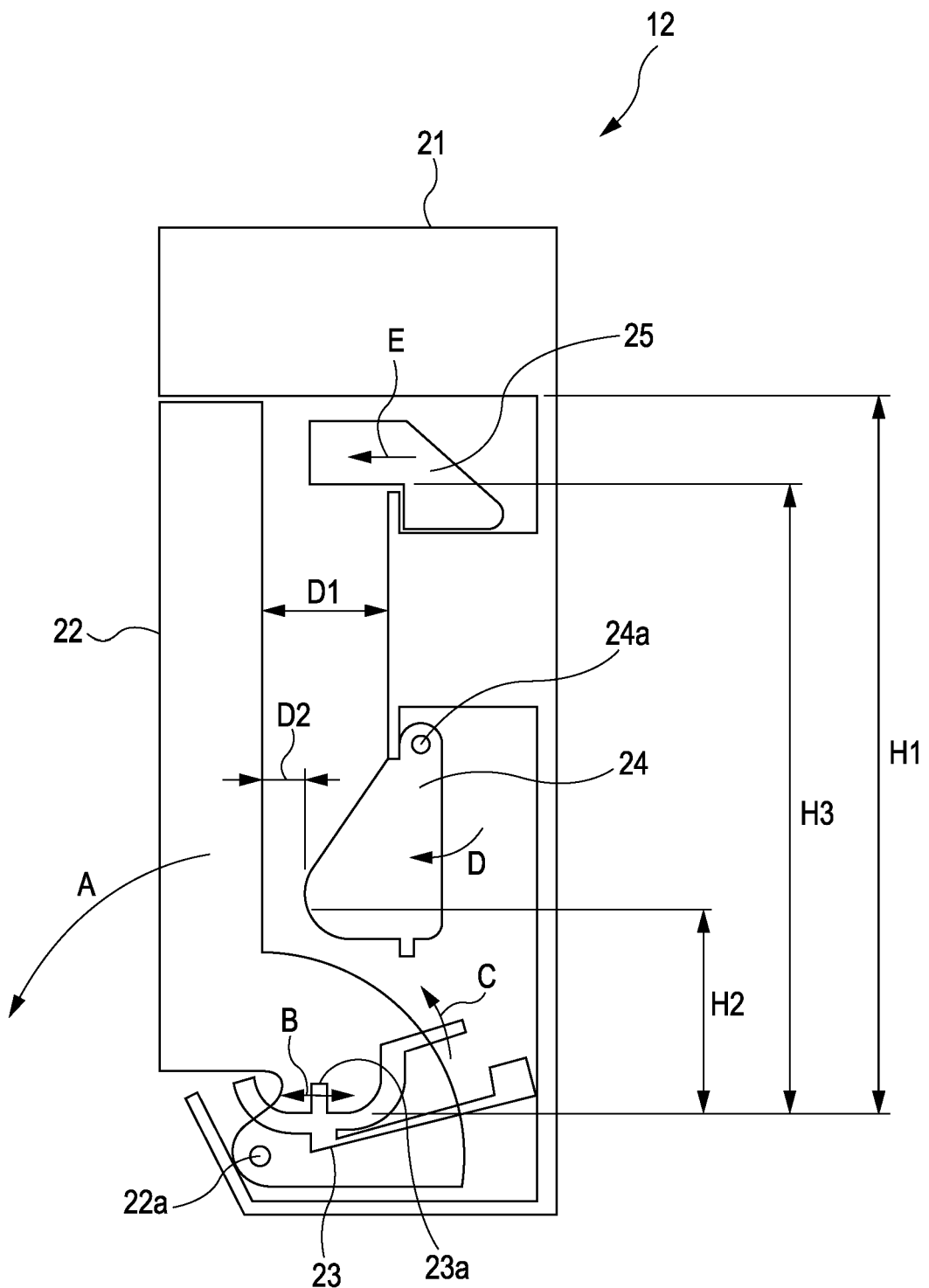
FIG. 2 shows a schematic configuration of a fitting unit 12.

Now, specific embodiments of the invention will be described in detail with reference to the drawings.

FIG. 1 is a perspective view showing a configuration example of an output device according to an embodiment of the invention.

As shown in FIG. 1, an output device 11 includes a fitting unit 12, speakers 13a and 13b, and an open button 14. The output device 11 can accommodate a portable player (not shown) (for example, one of portable players 31A to 31E shown in FIGS. 3 to 7).

The output device 11 has the fitting unit 12 substantially in the middle of the front side and allows a portable player to be fitted into an internal housing area, as will be described below with reference to FIG. 2. The fitting unit 12 has a connector (a connector 23a shown in FIG. 2) electrically connectable to the portable player. Signals of sound played back by the portable player are supplied through the connector to an amplifier (not shown) accommodated in, for example, an output device 11.

The speakers 13a and 13b are provided to the left and right, respectively, of the fitting unit 12 on the front side of the output device 11 and output sound played back by the portable player fitted into the fitting unit 12.

The open button 14 is provided, for example, on the top surface of the output device 11. Upon a user's operation of the open button 14, a door portion (a door portion 22 in FIG. 2) of the fitting unit 12 opens. When the user operates the open button 14 while the door portion of the fitting unit 12 is closed (as shown in the upper part of FIG. 1), the door portion of the fitting unit 12 is turned frontward of the output device 11 (as shown in the lower part of FIG. 1). When the user inserts the connector in the fitting unit 12 into a portable player and pushes the door portion of the fitting unit 12 to close it, the portable player is held at a predetermined position in the fitting unit 12.

Once the portable player is fitted into the fitting unit 12 of the output device 11 and the user operates the portable player to play back sound, sound signals are supplied from the portable player to the output device 11. The output device 11 amplifies the sound with the internal amplifier or the like to output the sound from the speakers 13a and 13b.

Referring to FIG. 2, a schematic configuration of the fitting unit 12 will be described.

FIG. 2 shows a schematic configuration of main components of the fitting unit 12, viewed from the right side of the output device 11. Note that the left side in FIG. 2 corresponds to the front side (near side) of the output device 11, and the right side in FIG. 2 corresponds to the back side (far side) of the output device 11.

As shown in FIG. 2, the fitting unit 12 includes a chassis 21, the door portion 22, a holder portion 23, and movable supporting portions 24 and 25.

The chassis 21 is a frame to which the door portion 22, the holder portion 23, and the movable supporting portions 24 and 25 are attached, and is securely fixed to the output device 11. The chassis 21 has, in the inside thereof, the housing area for accommodating a portable player. The housing area is open to the front side of the output device 11 and is closed by the door portion 22.

The door portion 22 is attached to the chassis 21 so as to be rotatable about a shaft 22a provided near the lower end thereof. FIG. 2 shows the door portion 22 in a closed state. The door portion 22 is urged counterclockwise (in FIG. 2) by springs (not shown) (for example, springs 22e and 22f in FIG. 12) and is locked by a lock mechanism (not shown). Upon a user's operation of the open button 14 (FIG. 1), the door portion 22 is unlocked and turned in a direction shown by an arrow A in FIG. 2. Thus, the housing area is opened.

The holder portion 23 has a U-shaped sectional shape with a width sufficient to hold the portable player having the largest bottom surface area among the portable players having different sizes that can be fitted into the fitting unit 12. Furthermore, the portable player that can be fitted into the fitting unit 12 has a female connector in the bottom surface thereof, and the holder portion 23 has, substantially in the middle of the U-shaped bottom surface thereof, a male connector 23a connectable to the connector of the portable player.

The holder portion 23 is freely slidable in the direction shown by an arrow B in FIG. 2 (the front-rear direction of the output device 11) when the door portion 22 is closed, and is locked and fixed to the chassis 21 when the door portion 22 is opened. Furthermore, the holder portion 23 is turned in response to the door portion 22 being opened or closed, and is turned in the direction shown by an arrow C in FIG. 2 when the door portion 22 is opened. This configuration of the holder portion 23 allows the connector 23a to be inclined toward the front side of the output device 11 and to be fixed in that state when the door portion 22 is opened. Thus, a user can easily insert the connector 23a into the portable player.

Figure 12:
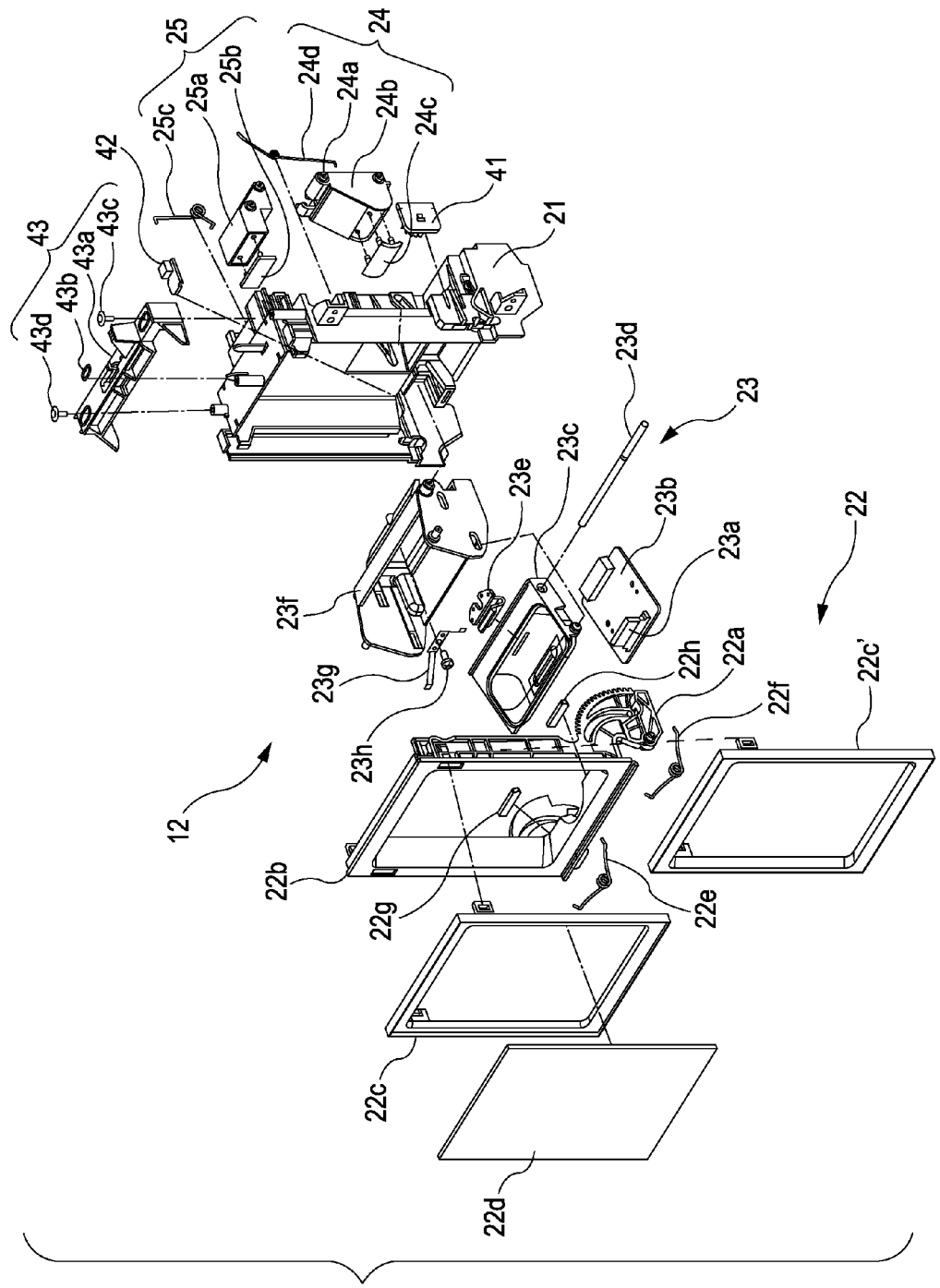
FIG. 12 is an exploded perspective view of the fitting unit 12.

The movable supporting portion 24 is attached to the chassis 21 so as to be rotatable about a shaft 24a provided near the upper end thereof and is urged in the direction shown by an arrow D in FIG. 2 by a spring (not shown) (for example, a spring 24d in FIG. 12).

A surface of the movable supporting portion 24 facing the front side of the output device 11 is inclined toward the front side from the top to the bottom, and the aforementioned surface and the bottom surface are connected via an arcuate curved surface. A portion of the curved surface located nearest to the front side in the housing area serves as an abutting portion that abuts against the portable player fitted into the fitting unit 12. Rotation of the movable supporting portion 24 about the shaft 24a enables the abutting portion of the movable supporting portion 24 to move within a predetermined range in the housing area in the depth direction of the housing area (the left-right direction in FIG. 2). FIG. 2 shows the movable supporting portion 24 with the abutting portion located nearest to the front side in the movable range by being urged by the spring.

Because the movable supporting portion 24 has the movable abutting portion and is urged by the spring toward the front side of the housing area, the movable supporting portion 24 can securely support portable players having different thicknesses within a movable range of the abutting portion.

The movable supporting portion 25 is attached to the chassis 21, near the upper end of the inside of the fitting unit 12, so as to be slidable in the depth direction of the housing area, and is urged by a spring (not shown) (for example, a spring 25c in FIG. 12) in the direction of an arrow E in FIG. 2. When a portable player having a height equal to or greater than a predetermined value is fitted, the movable supporting portion 25 can support the portable player at a portion near the upper end thereof.

The fitting unit 12 is configured as described above. To fit a portable player into the fitting unit 12, a user opens the door portion 22 and inserts the connector 23a of the holder portion 23 into the connector provided in the bottom surface of the portable player. Thus, the lower end of the portable player is fixed to the holder portion 23.

When the user closes the door portion 22, at least one of the movable supporting portions 24 and 25 abuts against the back surface of the portable player, urging the portable player toward the door portion 22. That is, as described above, the movable supporting portion 24 is urged by the spring in the direction of the arrow D in FIG. 2, urging the portable player against the door portion 22. The movable supporting portion 25 is urged by the spring in the direction of the arrow E in FIG. 2, urging the portable player against the door portion 22.

Now, let us assume that the distance between a surface of the door portion 22 facing the back side (the right side in FIG. 2) and a surface of the chassis 21 in the housing area facing the front side (the left side in FIG. 2) is a first depth D1 of the housing area, and the distance between the U-shaped bottom surface of the holder portion 23 (the surface against which the bottom surface of the portable player is abutted when the portable player is fitted) and a surface of the chassis 21 in the housing area facing downward is a first height H1 of the housing area. At this time, the fitting unit 12 can accommodate a portable player having a thickness less than the first depth D1 and a height less than the first height H1.

Furthermore, let us assume that the distance between the surface of the door portion 22 facing the back side and the abutting portion of the rotatable movable supporting portion 24 located nearest to the front side in the housing area (that is, the top of the curved surface of the movable supporting portion 24 on the left side in FIG. 2) is a second depth D2 of the housing area, and the distance between the U-shaped bottom surface of the holder portion 23 and the abutting portion of the rotatable movable supporting portion 24 located nearest to the front side in the housing area is a second height H2 of the housing area. At this time, a portable player having a thickness equal to or larger than the second depth D2 and a height equal to or larger than the second height H2 can be stably fitted into the fitting unit 12. That is, as long as the portable player has a thickness equal to or larger than the second depth D2 and a height equal to or larger than the second height H2, the movable supporting portion 24 can urge the back surface of the portable player. Accordingly, the portable player can be stably fitted by the holder portion 23, the movable supporting portion 24, and the door portion 22.

That is, the abutting portion of the movable supporting portion 24 is movable within the range from the second depth D2 to the first depth D1. Thus, as long as the portable player has a thickness in the range from the second depth D2 to the first depth D1 with respect to the surface of the door portion 22 facing the back side, the difference in thickness is compensated for and the portable player can be stably fitted into the fitting unit 12.

Assuming that the distance between the U-shaped bottom surface of the holder portion 23 and the surface of the movable supporting portion 25 facing downward is a third height H3 of the housing area, a portable player having a height equal to or greater than the height H3 can be stably fitted into the fitting unit 12. That is, as long as the portable player has a height equal to or greater than the height H3, the movable supporting portion 25 can urge the back surface of the portable player, near the upper end.

More specifically, the fitting unit 12 is designed such that the depth D1 is 19.1 mm and the depth D2 is 6.5 mm, for example. Thus, a portable player having a thickness in the range from 19.1 mm to 6.5 mm can be fitted. That is, portable players of any model can be stably fitted into the fitting unit 12 even if they differ in thickness by 12.6 mm (19.1 mm-6.5 mm) by models.

Furthermore, the fitting unit 12 is designed such that the height H1 is 120 mm, the height H2 is 50 mm, and the height H3 is 105 mm, for example. That is, a portable player having a height equal to or greater than 50 mm is urged by the movable supporting portion 24, and a portable player having a height equal to or greater than 105 mm is urged by the movable supporting portion 25, near the upper end. Thus, the portable player can be stably fitted.

FIGS. 3 to 7 show five portable players 31A to 31E having different sizes fitted into the fitting unit 12.

Figure 3:
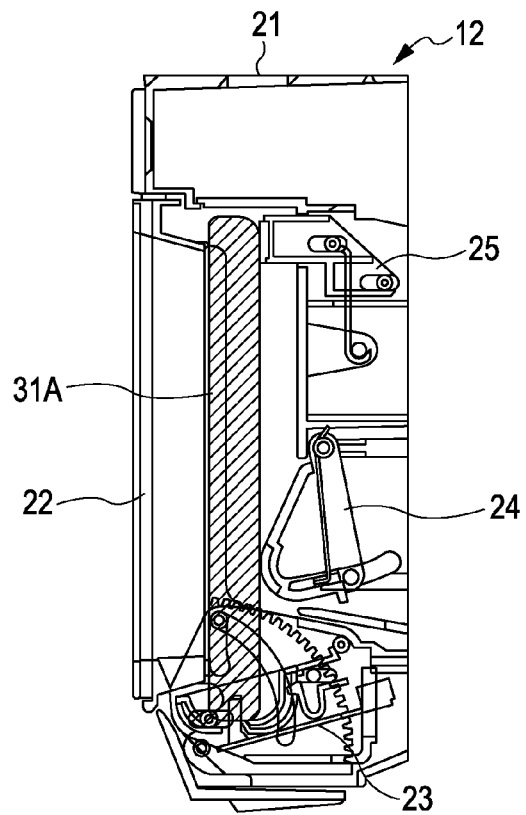
FIG. 3 shows a portable player 31A fitted into the fitting unit 12.

FIG. 3 shows the portable player 31A having, for example, a height of 115 mm, a width of 60 mm, and a thickness of 11.5 mm fitted into the fitting unit 12. The portable player 31A is urged against the door portion 22 by the movable supporting portion 25 at the upper end portion of the back surface thereof, and by the movable supporting portion 24 at a portion slightly below the middle of the back surface thereof.

Figure 4:
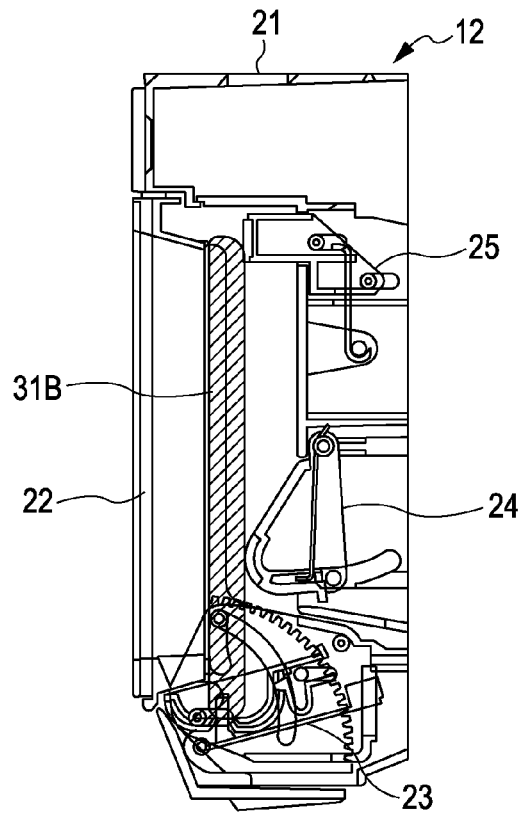
FIG. 4 shows a portable player 31B fitted into the fitting unit 12.

FIG. 4 shows the portable player 31B having, for example, a height of 110 mm, a width of 61.8 mm, and a thickness of 8.0 mm fitted into the fitting unit 12. Similarly to the portable player 31A, the portable player 31B is urged against the door portion 22 by the movable supporting portions 24 and 25.

Figure 5:
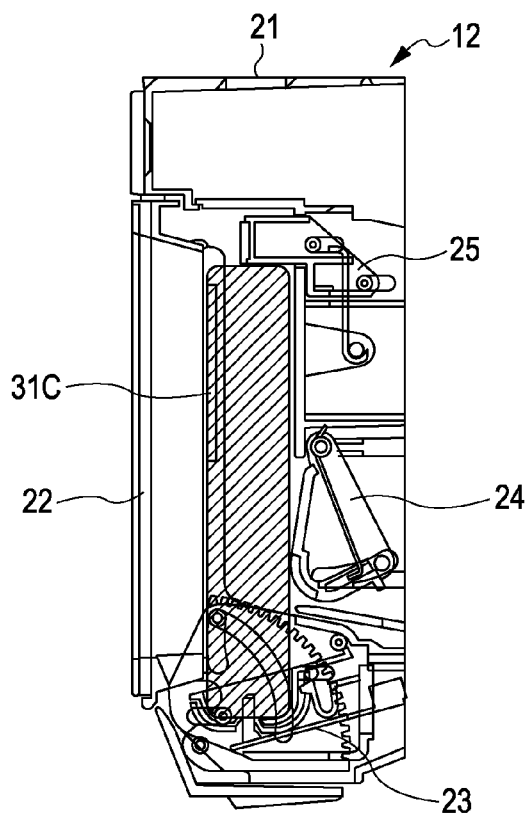
FIG. 5 shows a portable player 31C fitted into the fitting unit 12.

FIG. 5 shows the portable player 31C having, for example, a height of 104.1 mm, a width of 60.9 mm, and a thickness of 19.1 mm fitted into the fitting unit 12. Since the portable player 31C is shorter than the third height H3 (FIG. 2) of the housing area, the portable player 31C is urged against the door portion 22 by the movable supporting portion 24. Furthermore, since the thickness of the portable player 31C is equal to the depth D1 (FIG. 2) of the housing area, the back surface of the portable player 31C is in contact with the surface of the chassis 21 in the housing area, facing the front side (the surface between the movable supporting portions 24 and 25).

Figure 6:
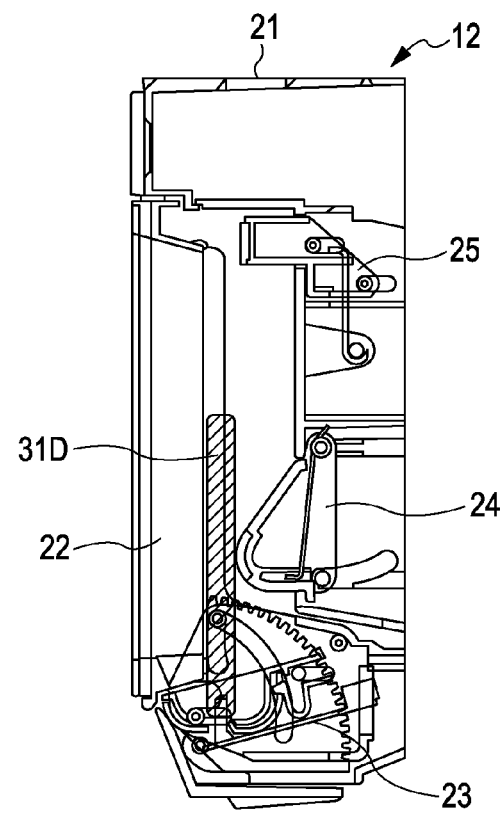
FIG. 6 shows a portable player 31D fitted into the fitting unit 12.
Figures 7, 8:
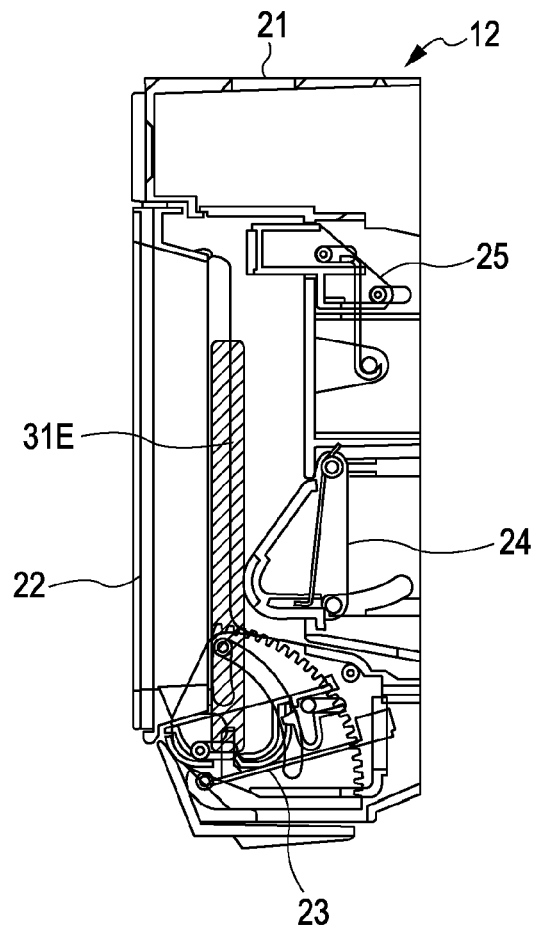
FIG. 7 shows a portable player 31E fitted into the fitting unit 12.
FIG. 8 is a table showing the size of the portable players.

FIG. 6 shows the portable player 31D having, for example, a height of 69.8 mm, a width of 52.3 mm, and a thickness of 6.5 mm fitted into the fitting unit 12. FIG. 7 shows the portable player 31E having, for example, a height of 90 mm, a width of 40 mm, and a thickness of 6.5 mm fitted into the fitting unit 12. The portable players 31D and 31E are urged against the door portion 22 by the movable supporting portion 24.

As shown in FIGS. 3 to 7, both the portable player 31C of 19.1 mm thick and the portable player 31E of 6.5 mm thick can be stably fitted into the fitting unit 12.

As shown in FIGS. 3 to 7, the connectors provided in the bottom surfaces of the portable players 31A to 31E are located at different positions. As has been described with reference to FIG. 2, the holder portion 23 is freely slidable in the direction of arrow B in FIG. 2 when the door portion 22 is closed. This enables the portable players 31A to 31E to be stably fitted into the fitting unit 12 along the surface of the door portion 22 facing the back side, even though their connectors are located at different positions.

FIG. 8 shows the positions of the connectors of the portable player 31C with the greatest thickness and the portable player 31E with the smallest thickness.

The portable player 31C has a thickness of 19.1 mm and is designed such that the distance from the connector center (center of the connector in the thickness direction) to the front surface is 9.52, and the distance from the connector center to the back surface is 9.58 mm. The portable player 31E has a thickness of 6.5 mm and is designed such that the distance from the connector center to the front surface and the distance from the connector center to the back surface are both 3.25 mm.

The portable player 31 is fitted into the fitting unit 12 such that the front side thereof is pressed against the door portion 22. Therefore, the holder portion 23 is slidable toward the front side of the portable player 31 so as to cope with the difference in position of the connectors. The difference between the distance from the connector center of the portable player 31C to the front surface thereof, 9.52 mm, and the distance from the connector center of the portable player 31E to the front surface thereof, 3.25 mm, is 6.27 mm. Therefore, if the holder portion 23 can slide at least 6.27 mm, these portable players 31 that differ in thickness can be fitted.

Furthermore, if the movable range of the abutting portion of the movable supporting portion 24 is 12.6 mm, which equals to the difference in thickness between the portable player 31C, 19.1 mm, and the portable player 31E, 6.5 mm, these portable players 31 that differ in thickness can be fitted.

Figure 9:
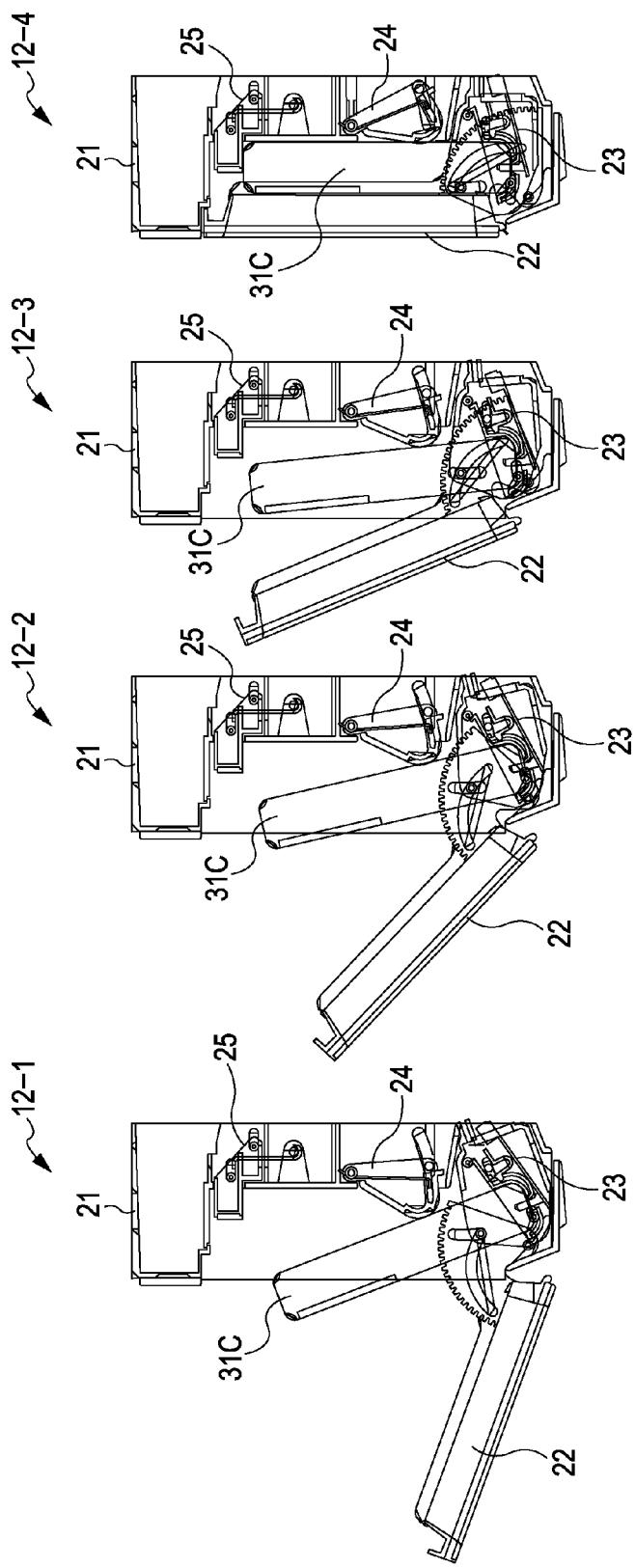
FIG. 9 shows the movements of the respective parts when the portable player 31C is fitted into the fitting unit 12.

Referring to FIG. 9, the movements of the respective parts when the portable player 31C is fitted into the fitting unit 12 will be described.

FIG. 9 respectively shows, from the left to the right, a fitting unit 12-1 with the door portion 22 that is completely opened, fitting units 12-2 and 12-3 with the door portion 22 that is being opened/closed, and a fitting unit 12-4 with the door portion 22 that is closed.

As described above, upon a user's operation of the open button 14 (FIG. 1) to unlock the door portion 22, the door portion 22 is completely opened and the housing area is opened, as shown in the fitting unit 12-1. At this time, the holder portion 23 is turned frontward in response to the door portion 22 being opened. The user inserts the connector 23a of the holder portion 23 into the connector provided in the bottom surface of the portable player 31C. At this time, the portable player 31C is inclined frontward according to the inclination of the holder portion 23.

When the user turns the door portion 22 by a finger or the like to close the door portion 22, the abutting portion of the movable supporting portion 24 abuts against the back surface of the portable player 31C, as shown in the fitting unit 12-2. When the user continues to turn the door portion 22, the portable player 31C urges the movable supporting portion 24 toward the back side, as shown in the fitting unit 12-3.

When the door portion 22 is closed and the housing area is closed, the portable player 31C stands upright, as shown in the fitting unit 12-4, and is fitted while being urged against the door portion 22 by the urging force of the movable supporting portion 24.

Figure 10:
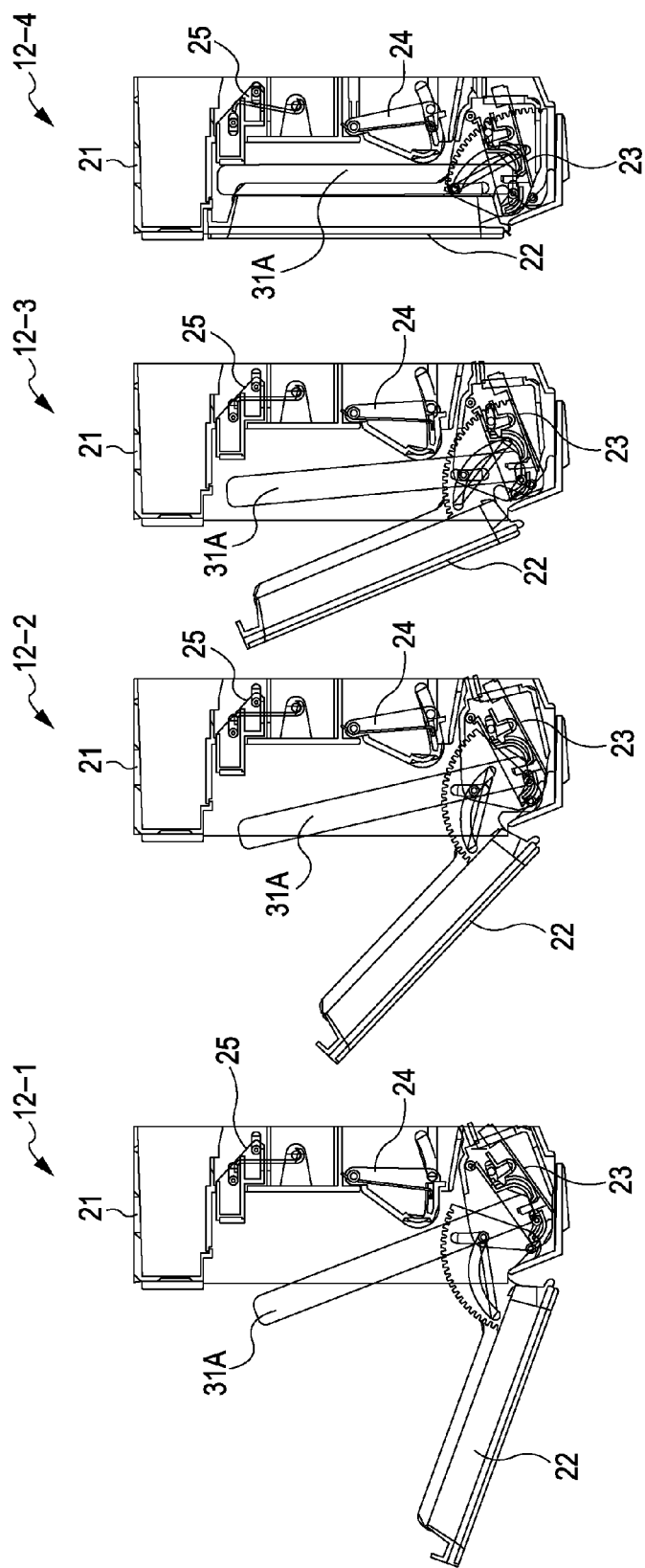
FIG. 10 shows the movements of the respective parts when the portable player 31A is fitted into the fitting unit 12.
Figure 11:
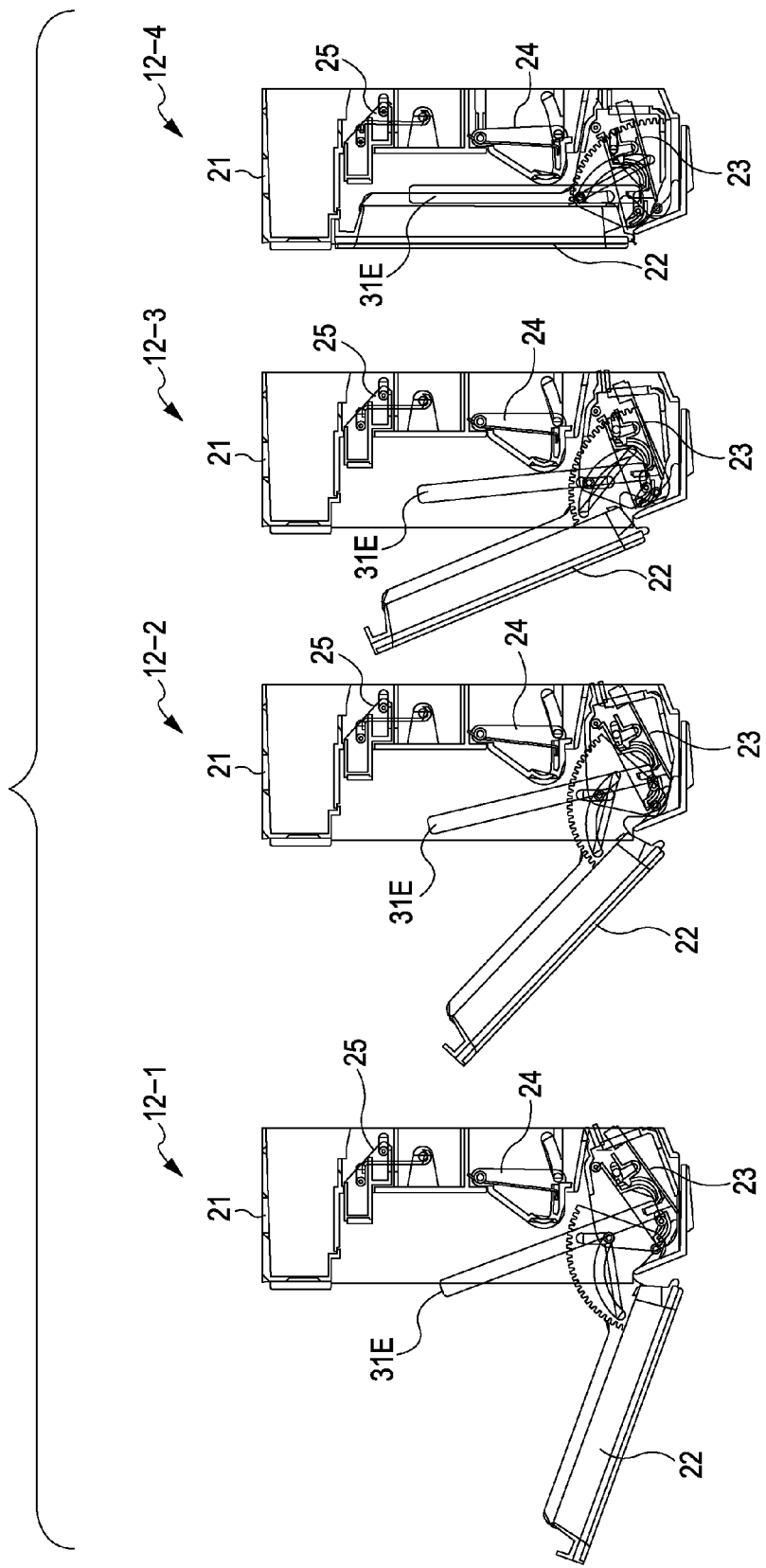
FIG. 11 shows the movements of the respective parts when the portable player 31E is fitted into the fitting unit 12.

FIG. 10 shows the movements of the respective parts when the portable player 31A is fitted into the fitting unit 12, and FIG. 11 shows the movements of the respective parts when the portable player 31E is fitted into the fitting unit 12. In the examples of FIGS. 10 and 11, the respective parts of the fitting unit 12 move in the same way as described above with reference to FIG. 9.

The portable player 31A shown in FIG. 10 is taller than the height H3 (FIG. 2). Thus, the upper end of the back surface of the portable player 31A pushes the movable supporting portion 25 toward the back side in response to the door portion 22 being closed. The upper end of the portable player 31A is urged by the urging force of the movable supporting portion 25.

The portable player 31E shown in FIG. 11 has a thickness substantially equivalent to the depth D2 (FIG. 2). Thus, the movable supporting portion 24 is hardly pressed, and supports the back surface of the portable player 31E with the urging force.

FIG. 12 is an exploded perspective view of the fitting unit 12.

As shown in FIG. 12, the fitting unit 12 includes the chassis 21, the door portion 22, the holder portion 23, the movable supporting portions 24 and 25, a door damper 41, a detection switch 42, and the lock mechanism 43.

The chassis 21 has attaching portions to which the parts are attached and an attaching portion with which the chassis 21 is attached to the output device 11. In addition, the back surface of the chassis 21 has openings through which the movable supporting portions 24 and 25 partially extend.

The door portion 22 includes a door body 22b having a shaft 22a, a door frame 22c, a window 22d, springs 22e and 22f, and supporting sheets 22g and 22h.

The door body 22b is attached to the chassis 21 via the shaft 22a. Both sides of the upper end of the door body 22b can be engaged with hooks provided on the lock mechanism 43. The door body 22b has an arcuate rack (part of a gear) formed around the shaft 22a. When the door body 22b is assembled with the chassis 21, the rack meshes with a gear of the door damper 41.

The door frame 22c is attached to the front side of the door body 22b so as to be removable, and the window 22d made of, for example, a transparent member is bonded to the door frame 22c. For the case where a user directly operates the portable player 31 via an operation part, e.g., the case where the portable player 31 fitted into the fitting unit 12 has an operation part such as a touch panel or the like, a door frame 22c' may be attached to the front side of the door body 22b instead of the door frame 22c. That is, the user can switch between the door frame 22c and the door frame 22c' of the fitting unit 12 according to the type of the portable player 31.

The springs 22e and 22f are fixed at one end to the chassis 21 and at the other end to the door body 22b to urge the door body 22b toward the front side.

The supporting sheets 22g and 22h are bonded to the back side of the door body 22b, near the lower end thereof. The supporting sheets 22g and 22h serve to cushion the contact between the front side of the portable player 31 and the door portion 22, when, for example, the movable supporting portion 24 presses the back surface of the portable player 31.

The holder portion 23 includes a connector substrate 23b having the connector 23a, a holder body 23c, a shaft 23d, a fixing spring 23e, a holder base 23f, a spring 23g, and a screw 23h.

The connector substrate 23b is a substrate on which a circuit for connecting the connector 23a on the connector substrate 23b to electric components accommodated in the output device 11 is printed. The connector substrate 23b is securely attached to the holder body 23c.

The holder body 23c has a recess conforming to the shape of the bottom portion of the largest portable player 31 that can be fitted into the output device 11. The connector substrate 23b is fitted to the holder body 23c such that the connector 23a projects inside the recess from an opening provided substantially in the middle of the recess. The holder body 23c has, near the rear end thereof, holes through which the shaft 23d can extend. The holder body 23c is attached to the holder base 23f so as to be slidable in the front-rear direction of the output device 11 (the direction of the arrow B in FIG. 2) via the shaft 23d and projections provided near the front end of the holder body 23c.

The fixing spring 23e is attached between the holder body 23c and the holder base 23f and locks the holder body 23c so as not to slide when the holder portion 23 is turned in response to the door portion 22 being opened. The holder base 23f supports the holder body 23c so as to be slidable and is attached to the chassis 21 so as to be turnable via the shaft provided near the rear upper end of the holder base 23f. The spring 23g is attached to the holder base 23f with the screw 23h and urges the holder base 23f such that the holder portion 23 turns in response to the door portion 22 being opened.

The movable supporting portion 24 includes a supporting portion body 24b having the shaft 24a, a supporting sheet 24c, and a spring 24d.

The supporting portion body 24b is attached to the chassis 21 via the shaft 24a so as to be rotatable. The supporting sheet 24c is fitted to a curved surface serving as the abutting portion that abuts against the portable player 31. The supporting sheet 24c serves to cushion the contact between the movable supporting portion 24 and the portable player 31. The spring 24d is fixed at one end to the chassis 21 and at the other end to the supporting portion body 24b to urge the abutting portion of the movable supporting portion 24 toward the front side.

The movable supporting portion 25 includes a supporting portion body 25a, a supporting sheet 25b, and a spring 25c.

The supporting portion body 25a is attached to the chassis 21 such that projections provided on both sides thereof are engaged with grooves provided in the chassis 21 so as to be slidable along the grooves in the chassis 21. The supporting sheet 25b is fitted to the front end of the supporting portion body 25a to cushion the contact between the movable supporting portion 25 and the portable player 31. The spring 25c is fixed at one end to the chassis 21 and at the other end to the supporting portion body 25a to urge the movable supporting portion 25 to the front side.

The door damper 41 is attached to a side surface of the chassis 21 and has the gear and a mechanism for controlling the rotational speed of the gear. Meshing of the gear of the door damper 41 and the rack formed on the door body 22b controls the speed at which the door portion 22 is opened by the urging force of the springs 22e and 22f when the door portion 22 is unlocked.

The detection switch 42 is provided near the bottom surface of the chassis 21. The detection switch 42 is turned on when the portable player 31 is fitted into the fitting unit 12 and detects that the portable player 31 is fitted, and informs a control unit (not shown) of it.

The lock mechanism 43 includes a lock mechanism body 43a, a spring 43b, and screws 43c and 43d.

The lock mechanism body 43a has the hooks at both ends on the front side that can be engaged with the door body 22b. By engaging the hooks and the door body 22b, the door portion 22 is locked. A user's operation of the open button 14 (FIG. 1) slightly moves the lock mechanism body 43a downward, disengaging the hooks of the lock mechanism body 43a from the door body 22b. Thus, the door portion 22 is unlocked.

The spring 43b serves to return the lock mechanism body 43a to a predetermined position after the operation of the open button 14 by the user. The screws 43c and 43d serve to attach the lock mechanism body 43a to the chassis 21.

The fitting unit 12 is configured as described above, and the portable player 31 can be accommodated in the housing area in the fitting unit 12. Thus, the output device 11 can more stably hold the portable player 31 than an output device that holds a portable player placed thereon. This makes a user feel comfortable to carry the output device 11 into which the portable player 31 is fitted.

Furthermore, because the movable supporting portion 24 is rotatable about the shaft 24a and the abutting portion that comes into contact with the portable player 31 is movable in the depth direction within a predetermined range, the portable players 31 having different thicknesses can be stably fitted.

Furthermore, if the portable player 31 has a height equal to or greater than a predetermined value, the movable supporting portion 25 can urge the upper end of the back side of the portable player 31 toward the door portion 22. Thus, fitting of the portable player 31 having a height equal to or greater than a predetermined value can be more stabilized.

Furthermore, the holder portion 23 having the connector 23a is slidable in the depth direction of the fitting unit 12 when the door portion 22 is closed. Thus, even if a user applies force when touching and operating the portable player 31 fitted into the fitting unit 12, the holder portion 23 can slide and release the force. Thus, damage to the connector 23a and the connector of the portable player 31 can be prevented.

The output device 11 can charge the portable player with electricity supplied from an external power source or with electricity stored in a built-in battery (not shown). The output device 11 includes a compact disc (CD) player and an AM/FM radio tuner (both are not shown) so that it can output sound of CDs and radio, in addition to the sound played back by the portable player.

Furthermore, in addition to the portable player 31 for playing back sound and pictures, portable terminals, such as a portable telephone and a personal digital assistant (PDA), can be fitted to the output device 11.

The present application contains subject matter related to that disclosed in Japanese Priority Patent Application JP 2008-186100 filed in the Japan Patent Office on Jul. 17, 2008, the entire content of which is hereby incorporated by reference.

Embodiments of the invention are not limited to those described above, but may be variously modified so long as they do not depart from the scope of the invention.

What is claimed is:

1. A fitting mechanism comprising:
a door member that is provided on a front side of a housing area for accommodating a terminal device and opens and closes the housing area;
a holder portion comprising a connector substrate and a connector, wherein the connector is electrically connectable to the terminal device, and wherein the connector is slidable in a depth direction of the housing area when the housing area is closed by the door member; and
a supporting member that is provided on a back side of the housing area and supports the terminal device when accommodated in the housing area by urging the terminal device against the door member when closed, wherein the terminal device is urged against the door member using a spring connected to the supporting member and a chassis of the fitting mechanism,
wherein the supporting member comprises an abutting portion configured to abut against the terminal device, the supporting member being rotatable about a shaft to enable the abutting portion to move in the depth direction of the housing area within a predetermined movable range.

2. The fitting mechanism according to claim 1, wherein the holder portion is provided on a bottom surface of the housing area.

3. The fitting mechanism according to claim 1, further comprising a second supporting member that is provided near an upper end of the back side of the housing area and supports the terminal device having a height equal to or greater than a predetermined value by urging the upper end thereof against the door member.

4. An output device comprising:
a door member that is provided on a front side of a housing area for accommodating a terminal device and opens and closes the housing area;
a holder portion comprising a connector substrate and a connector, wherein the connector is electrically connectable to the terminal device, and wherein the connector is slidable in a depth direction of the housing area when the housing area is closed by the door member;
a supporting member that is provided on a back side of the housing area and supports the terminal device when accommodated in the housing area by urging the terminal device against the door member when closed, wherein the terminal device is urged against the door member using a spring connected to the supporting member and a chassis of the fitting mechanism; and
an output unit that outputs content played back by the terminal device,
wherein the supporting member comprises an abutting portion configured to abut against the terminal device, the supporting member being rotatable about a shaft to enable the abutting portion to move in the depth direction of the housing area within a predetermined movable range.

5. The fitting mechanism according to claim 1, wherein the abutting portion of the supporting member includes a curved surface.

6. The fitting mechanism according to claim 1, wherein the supporting member further comprises a spring configured to urge the abutting portion of the supporting member toward the front side of the housing area.

7. The output device according to claim 4, wherein the abutting portion of the supporting member includes a curved surface.

\* \* \* \* \*